Patented Nov. 19, 1929

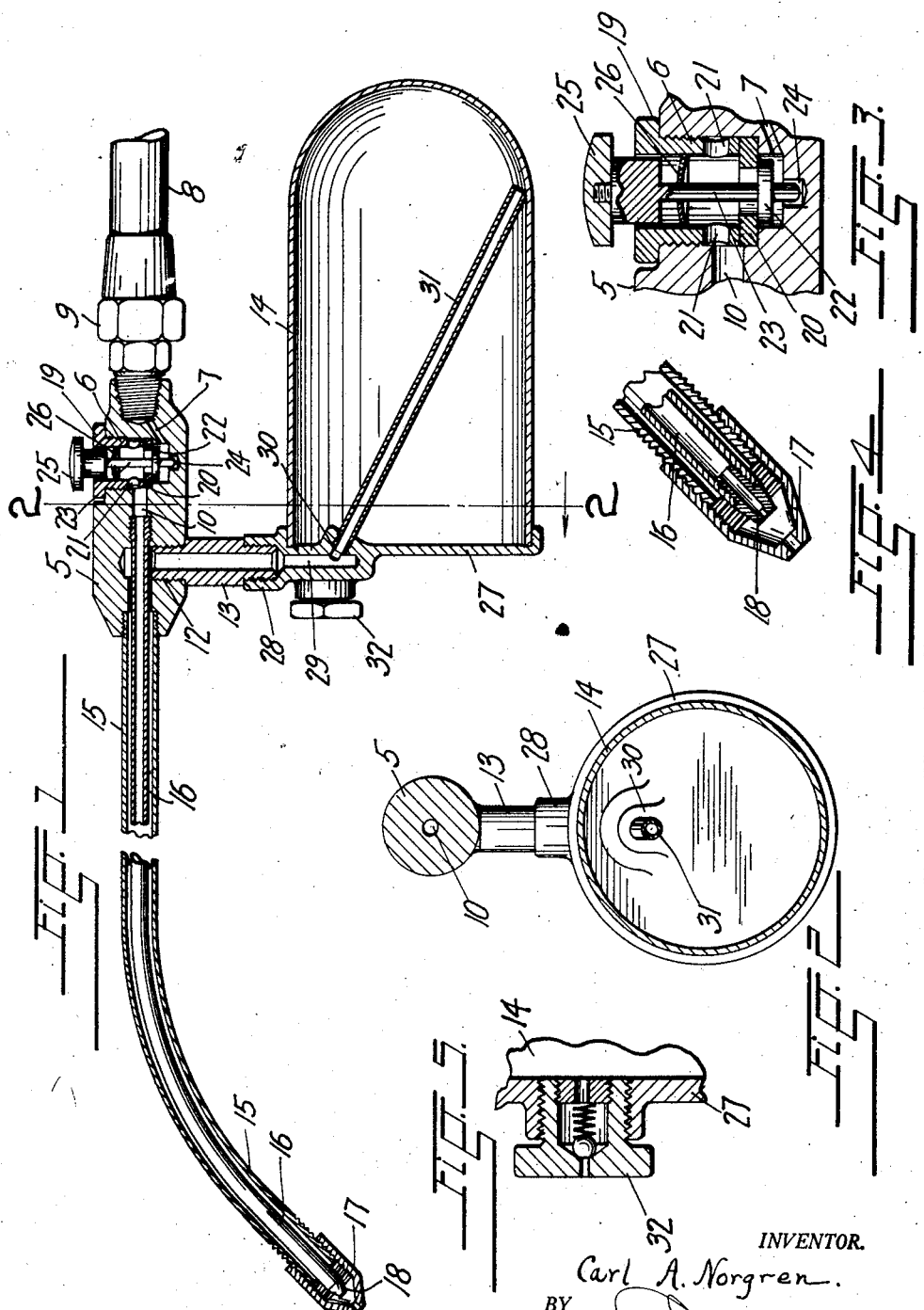

1,736,357

UNITED STATES PATENT OFFICE

CARL A. NORGREN, OF DENVER, COLORADO

SPRAY GUN

Application filed March 26, 1927. Serial No. 178,653.

This invention relates to lubricating guns and its principal object is to provide a device of simple construction adapted to spray oil between the leaves of automobile springs and other parts of motor vehicles through the medium of air under pressure.

Another object of the invention is to provide a gun of the above described character which can be operated at any angle from the horizontal to the vertical thereby permitting of its use in any practical position.

A further object is to provide a spray gun having an adjustable and removable nozzle to vary or discontinue the discharge of oil in the operation of the gun and to facilitate cleaning. Another object is to provide an air-controlling valve which is automatically sealed against leakage when the gun is in operation and still other objects reside in details of construction as will be brought out in the course of the following description.

In the accompanying drawings in which corresponding parts in the several views have been similarly designated—

Figure 1 represents a sectional elevation of the spray gun,

Figure 2, a section taken on the line 2—2 Figure 1,

Figure 3, an enlarged section of the air valve included in the construction,

Figure 4, an enlarged section of the tip or discharge end of the same, and

Figure 5, a section of the filler neck and cap of the siphon cup included in the construction.

The reference numeral 5 designates the body of the gun, which has a valve chamber 6 connected at its inner portion by a duct 7 with a screw-threaded socket at an end of the body in which a conduit 8 connected with a conveniently located source of air supply, is fastened by means of a coupling 9. An axial bore 10 at the opposite end of the body likewise connects with the valve chamber, and a passage 12 transverse to the bore is screw-threaded for the application of a short tube 13 that connects with the siphon cup 14.

The bore 10 has three sections of progressively increased diameters, the smallest of which connects with the valve chamber and the largest of which is at the end of the body and screw-threaded for the attachment of a bent pipe 15. A second pipe 16 of smaller diameter is screwed into the smaller end of the bore and it extends inside the larger pipe to provide an annular space through which the oil passes to the jet or nozzle through which it is discharged onto the machine parts to be lubricated.

The nozzle consists of an apertured cap 17 screwed onto the end of the outer pipe around a jet tip 18 screwed into the end of the inner pipe. The cap is normally spaced from the tip to provide a passage for the discharge of the oil but it can be screwed into engagement with the tip to seal the device when not in use.

Mounted in the valve chamber 6 is a valve device which controls the passage of air from the conduit 8 to the air pipe 16. The device consists of a cage 19 screwed into the chamber in engagement with a washer or gasket 20 of soft material placed against a shoulder at the inner end of the chamber to provide a resilient valve seat.

The cage has one or more ports 21 in an exterior groove for the connection of its interior with the bore 10 of the body into which the air pipe 16 extends.

The valve proper consists of a flat disk 22 fastened upon the reduced end portion of a stem 23 which extends coaxially with the cage and into a recess 24 at the inner end of the valve chamber. A button 25 outside the valve chamber, has a shank slidably fitted inside the valve cage to engage with the end of the valve stem.

A flexible sealing diaphragm 26 fixed on the valve stem, contacts with the wall of the cage to prevent leakage of air past the valve stem when the button is depressed to separate the valve from its seat.

When the valve is in the closed position in which it engages the resilient gasket at the under side thereof, the diaphragm cups upward as shown in the drawings and if the button is depressed, the consequent inward movement of the valve stem causes the diaphragm to press tightly against the wall of the valve cage thereby sealing the latter against the escape of air around the valve stem.

When the button is subsequently released, the diaphragm springing back to its normal shape, aids in returning the valve to its original position. The siphon cup 14 is of cylindrical form and extends axially in substantially parallel relation to the body of the gun. It has a flanged head 27 provided with a threaded socket 28 for its attachment to the short tube 13 and it has in communication with the nozzle, a short duct 29 provided with a transverse opening 30 for the connection of a siphon tube 31.

This tube extends to the end of the cup rearward of the gun with relation to the position of its discharge nozzle and it is this feature in the construction which permits of the gun being operated at different angles from the horizontal to the vertical.

A filler neck on the head of the siphon cup is closed by a cap 32 which as usual is provided with a valve controlled air vent to break the vacuum formed in the cup when the oil is discharged therefrom.

In the operation of the gun, the cup is filled with oil and the body is connected with the hose 8 of a source of air supply. The air passing through the duct 7 into the inner end of the valve chamber presses the valve 22 against the resilient seat provided by the gasket and thereby obstructs the flow of air to the interior of the valve cage.

To apply the oil to a machine part, the button is depressed which separates the valve from its seat and establishes a line of communication between the source of air and the pipe 16 by means of the conduit 8, the duct 7, the valve chamber 6, the port or ports 21 of the cage 19 and the bore 10 of the housing. The air forcibly driven through the jet 18 at the end of the pipe, produces a partial vacuum which draws the oil from the siphon cup through the pipe connection 13 and the annular space between the pipes 15 and 16 and causes it to issue through the aperture of the cap 17 on the outer pipe in the form of a spray.

The relative sizes of the apertures in the cap and the jet are such as to produce a maximum atomizing effect. The discharge is readily regulated by adjustment of the screw cap relative to the air jet and when the gun is not in use the outlet may be sealed by screwing the cap tight against the tip.

The pipes are bent at an angle of approximately 45 degrees to render its nozzle accessible to different parts of an automobile from a point beneath the same. The cup-shaped washer of the valve effectively seals the valve chamber against the escape of air without restricting or otherwise interfering with the movement of the valve, and the position of the siphon cup and the siphon pipe relative to the body of the gun permits of using the gun at different angles as hereinbefore explained.

Having thus described my invention, what I claim and desire to secure by Letters Patent is:—

A spray gun comprising a body having a valve chamber and means to connect the chamber with a source of pressure fluid, an oil container, a pressure fluid pipe extending from the body and in communication with said valve chamber, a liquid conducting pipe extending from the body and co-axially surrounding and spaced from said pressure-fluid pipe, connections from said liquid conducting pipe, communicating with the lower part of the container, a valve in the chamber controlling the passage of pressure-fluid pipe, a jet having a seat and being at the end of the pressure-fluid pipe remote from the body, and an adjustable nozzle at the end of the liquid conducting pipe remote from the body, said nozzle being formed to cooperate with said seat in one position of adjustment to seal the liquid conducting pipe.

In testimony whereof I have affixed my signature.

CARL A. NORGREN.